Patented June 6, 1950

2,510,777

UNITED STATES PATENT OFFICE 2,510,777

POLYAMIDE TREATED WITH A HYPO-PHOSPHOROUS ACID COMPOUND

Hugh W. Gray, Wilmington, Del., assignor to E. I. du Pont de Nemours & Company, Wilmington, Del., a corporation of Delaware No Drawing. Application December 30, 1946, Serial No. 719,335

12 Claims. (Cl. 260—45.7)

This invention relates to polymers of the nylon type, and more particularly to such polymers having improved stability at elevated temperatures.

Polymers of the nylon type, that is, synthetic linear polyamides prepared from polymerizable mono-amino carboxylic acids or their amide-forming derivatives, or from suitable diamines and suitable dicarboxylic acids or amide-forming derivatives of these compounds, possess a number of properties such as great toughness and high tensile strength which make them of great value in many applications. The preparation and use of such polymers are illustrated in U. S. Patents 2,071,250; 2,071,253; and 2,130,948. The polyamides described in these patents are high molecular weight polymers which as a class are microcrystalline in structure. In certain applications, the nylon is subjected to heat treatments of various types to obtain improved properties. For example, nylon fabrics are "heat-set" to obtain increased resilience and to improve their hand. Also, resins are often applied to films and fibers of nylon at elevated temperatures to impart certain desired characteristics to the nylon. However, when nylon is subjected to the high temperatures necessary for securing these desired properties, extreme care must be taken to avoid undesirable discoloration, and in some cases the fabric is seriously impaired in strength.

This invention has as an object a new and useful composition of matter. A further object is a method for improving the properties of nylon when subjected to elevated temperatures. A further object is a method for obtaining heat-set nylon fabrics, fibers, films and the like, which avoids or materially reduces the loss in strength that usually results from the heat-setting operation. A still further object is a method by means of which nylon can be subjected to high temperature without undesirable discoloration. Other objects will appear hereinafter.

I have discovered that the impairment in strength and the discoloration of nylon by heat referred to above can be reduced by incorporating into the nylon a minor amount by weight of a hypophosphorous acid compound which can consist of this acid itself, which has the formula $H_3PO_2$, or of a derivative thereof. These derivatives are the inorganic salts of hypophosphorous acid, aryl or alkyl phosphinic acids, and the salts and esters of these phosphinic acids and of the isomeric phosphonous acids. In some instances, these agents additionally impart greater stability of the nylon to ultraviolet light and to outdoor exposure.

In the best method for carrying out the invention, the nylon fabric, yarn, or the like is impregnated with a solution of the hypophosphorous acid compound in a suitable solvent, excess solution, if any, is removed, and the impregnated material dried. The fabric or yarn can then be heat-set by heating it to a temperature above 140° C. but below the melting point of the nylon with but very little loss in strength and very slight discoloration.

The impregnation can be carried out in conventional fabric treating equipment, for example, by dipping the fabric in the solution and then passing the impregnated fabric through quetch rolls to remove excess solution, or by impregnating the fabric in a padder. The wet, impregnated fabric can be subjected to the desired heat treatment directly, or can be dried before such heat treatment. The particular solvent used will, of course, depend on the solubility characteristics of the particular derivative being employed. For economical reasons water and the lower alcohols, e. g., methyl and ethyl alcohol, are preferred. However, other organic solvents for the hypophosphorous acid and its derivatives can be used if desired.

The hypophosphorous compound is incorporated into the nylon in amount of at least 0.01% of the latter and up to 20%. The preferred amounts are at least 0.1% and, in general, it is desirable to use only the minimum proportions of the agent necessary to obtain the desired effect since the excess tends to decompose during the heat treatment. For this reason the agent is not generally used in amount greater than 10%. From 0.5% to 5% of hypophosphorous acid or its alkali-metal salts are particularly effective in stabilizing nylon fabrics which are to be subjected to finishing treatments at temperatures of 215° to 230° C. to produce the resilience and hand desired in the fabric.

The concentrations of the impregnating solutions can be varied considerably in obtaining impregnation by the agent in the above mentioned amounts. The concentration will depend also on the particular method of impregnation being employed, and on the form of the nylon. Solutions raanging from 1% to 20% in concentration, giving impregnations of 0.1% to 20% of the agent based on the weight of the nylon, are very suitable for impregnating nylon fabrics. An amount of solution which will be taken up completely by the nylon being treated can be used, or the nylon can be soaked in an excess of solution, after which the excess is removed by passing through wringer rolls, by pressing, or by wiping with an absorbent material, in each case the residual solvent being removed by evaporation. The impregnation can be carried out at ordinary or elevated temperatures for various lengths of time. The time of impregnation should be sufficient to produce uniform impregnation. Usually periods of 5 to 15 minutes are sufficient; however, longer times, e. g., up to several hours or more are also operable.

Another method of forming the compositions of this invention involves dissolving the hypophosphorous acid compound in a solution of the nylon in a solvent such as phenol, formic acid, alcohol-calcium chloride mixture, etc. In this embodiment the desired amount of the agent is blended into the solution of the nylon and after a uniform mixture is obtained the solution is formed into the desired film, fiber, or other shape and the solvent removed by evaporation.

In still another method of preparing the compositions of this invention, the hypophosphorous acid compound is blended with molten nylon and the resulting blend formed into the desired shaped article, for example, by molding. This method is less satisfactory than those described above because hypophosphorous acid and its derivatives tend to decompose at the temperatures necessary to melt nylon. For example, in the preparation of molding powders composed of nylon and the hypophosphorous acid compound, undesirable bubbles may form when the nylon is melted. The resulting composition is, however, less discolored than nylon melted in the absence of a stabilizer.

The invention is illustrated by the following examples in which the proportions of ingredients are expressed in parts by weight unless otherwise noted.

Example I

A piece of polyhexamethyleneadipamide taffeta fabric is impregnated with an equal weight of an aqueous solution containing 5% sodium hypophosphite, H₂P(:O)ONa, by working it in the solution until it is uniformly wet. This amount of solution is just sufficient to thoroughly wet the fabric without leaving an excess. The impregnated fabric is dried and then placed in an oven at 202° C., the temperature raised to 215° C. in 4 minutes, and held at 215° C. for 3 more minutes. After this treatment the fabric is washed in a dilute aqueous olive oil soap solution, rinsed with water, and ironed at 150° C. The fabric is only very slightly discolored. A control fabric subjected to the same heat treatment but not impregnated with sodium hypophosphite is very badly discolored. The physical properties of the treated fabric are also markedly superior to those of the control. Tensile strengths (1" ravel strip test) of the hypophosphite-treated fabric are 78 lbs. and 70 lbs., elongations are 32% and 38%, and tongue tear tests are 4 lbs. and 4 lbs. in the warp and filling directions, respectively. The corresponding test values for the untreated control fabric similarly heated are tensile strengths of 28 and 29 lbs., elongations 16% and 18%, and tongue tear tests of 0.8 and 0.5 lb. in the warp and filling directions, respectively.

Example II

A piece of the polyhexamethyleneadipamide fabric of Example I is impregnated in the same manner with an equal weight of an aqueous solution containing 3% sodium hypophosphite, and 30% of ethylene glycol. A control fabric is also impregnated in the same way with aqueous 30% glycol solution containing no sodium hypophosphite. Several portions of these two fabrics are placed in an oven for 5 minutes at temperatures of 200°, 210° and 220° C. After the heat-treated fabrics are removed from the oven, they are washed with a dilute aqueous olive oil soap solution, rinsed with water, and ironed at 150° C. The fabric impregnated with the solution containing 3% sodium hypophosphite is not discolored by the 200° and 210° treatments, and is only slightly discolored at 220°. The control fabric is found to be slightly discolored at 200° and badly discolored at 210° C.

Example III

A film of the polyamide prepared from di(p-amino-cyclohexyl)methane and sebacic acid is soaked overnight in a 5% solution of hypophosphorous acid, H₂P(:O)OH, in methanol. The film is removed from the solution, excess solution is wiped off, and the film is dried in a vacuum desiccator. The dry film is heated in air at 255° C. for 5 minutes. This heated film is darkened less than an untreated control film of the same nylon heated in the same way.

Example IV

Ten parts of the polyamide prepared from di(p-amino-cyclohexyl)methane and sebacic acid and 0.04 part of sodium hypophosphite are heated in a sealed tube at 215° C. for one hour and in an atmosphere of nitrogen at 330° C. for 2 hours. The resulting clear, viscous melt forms a white solid on cooling. A film pressed from this solid and heated in air at 255° C. for 2 minutes shows significantly less discoloration than a control film prepared in the same manner from the same nylon without the sodium hypophosphite.

Example V

Ten parts of the polyamide prepared from di(p-amino-cyclohexyl)methane and sebacic acid are dissolved in a mixture of 40 parts of chloroform and 10 parts of methanol. To this solution is added 0.2 part of a 50% aqueous solution of hypophosphorous acid. After stirring until uniform, the solution is spread in a uniform layer on a glass plate and the solvent evaporated at room temperature during 3 days. The resulting clear film is stripped from the glass plate, dried 6 hours at 45–50° C., and then heated in air at 190° C. for 10 minutes. The resulting film is significantly lighter in color than a similarly heated control film prepared the same way without the hypophosphorous acid.

Example VI

A monofil of polyhexamethylenesebacamide is soaked for 6 hours in methanol containing 5% water and 5% hypophosphorous acid and is then dried 3 days in a vacuum desiccator over calcium chloride. When heated for 25 minutes at 220° C., the dry monofil is less discolored than an untreated monofil of the same polymer heated in the same way.

Example VII

Laundered polyhexamethyleneadipamide satin fabric is immersed for 15 minutes at room temperature in a 5% solution of phenylphosphinic acid,

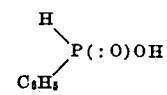

in 95% ethanol. Excess liquid is then removed by passing the fabric through wringer rolls, after which the fabric is air-dried. Analysis indicates that this treatment introduces 2.6% of phenylphosphinic acid into the nylon fabric. Samples of the fabric are then baked in air at 225° C. for 5 minutes and 15 minutes, along with unimpregnated controls. The impregnated fabric retains a yarn tenacity of 4.5 g./d. and 2.9 g./d. after 5 and 15 minutes' baking, respectively, whereas the controls have a tenacity of only 2.3 g./d. and 2.0 g./d. after the same heat treatments. The impregnated fabric also shows less discoloration than the controls. Samples of the impregnated and control fabrics are also exposed to ultraviolet radiation in a Fade-Ometer. The impregnated fabric shows generally superior tensile strength retention as compared to the control. Similarly, superiority of tensile retention is observed in the impregnated fabric when samples of the two fabrics are exposed outdoors at 45° south for six weeks.

*Example VIII*

A sample of laundered polyhexamethyleneadipamide fabric is immersed for 90 minutes in a 5% solution of the diphenyl ester of benzenephosphonous acid, $C_6H_5P(OC_6H_5)_2$, (also known commercially as diphenyl phenylphosphinate) in 95% ethanol, the excess liquid is removed by passing through wringer rolls, and the fabric is air-dried. The dry fabric is then baked in an air oven at 225° C. for 15 minutes. After this treatment, the impregnated fabric retains a tenacity of 4.0 g./d., whereas a non-impregnated control fabric baked in the same oven has a tenacity of only 2.3 g./d. The impregnated fabric is also less discolored than the control. Similarly, the impregnated fabric exhibits superior tenacity retention when exposed to ultraviolet light in the Fade-Ometer, and when exposed outdoors to the atmosphere.

*Example IX*

Laundered polyhexamethyleneadipamide satin fabric is soaked for 15 minutes in a 7.5% aqueous solution of the sodium salt of phenylphosphinic acid, and excess liquid is removed by passing the fabric through wringer rolls, after which the fabric is air-dried. It is then immersed for 15 minutes at room temperature in a 10% aqueous solution of calcium chloride, wrung out, rinsed briefly in cold water, and air-dried again. The impregnated fabric, containing calcium phenylphosphinate,

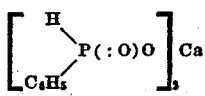

is then baked in an oven at 225° C. for 5 minutes. The treated fabric retains a tenacity of 3.4 g./d., while a non-impregnated control subjected to the same heat treatment has a tenacity of only 2.3 g./d. The impregnated fabric likewise exhibits improved tenacity retention when exposed to ultraviolet light in the Fade-Ometer and when subjected to outdoor exposure.

The nylons used in the practice of this invention comprise the reaction products of a linear polymer-forming composition containing amide-forming groups, e. g., those obtained by reacting material consisting essentially of bifunctional molecules, each containing two reactive groups which are complementary to reactive groups in other molecules and which includes complementary amide-forming groups. These polyamides can be obtained by the methods given in the previously mentioned patents and by other methods, e. g., by self-polymerization of a monoamino-monocarboxylic acid such as 6-aminocaproic acid, by reacting a diamine with a dibasic carboxylic acid in substantially equimolecular amounts, or by reacting ethanolamine or other monoaminomonohydric alcohol with a dibasic carboxylic acid in substantially equimolecular amounts, it being understood that these reactants can be replaced by their equivalent amide-forming derivatives. These polycarbonamides have an intrinsic viscosity of at least 0.4, and have an average number of carbons of at least 2 in the segments of the chain separating the amide groups. The preferred polyamides have a unit length (defined as in U. S. Patents 2,071,253 and 2,130,948) of at least 7.

Specific examples of other nylons which can be used in the compositions of this invention include polytetramethylenesebacamide, polypentamethyleneadipamide, polypentamethylenesebacamide, polyhexamethylenesuberamide, polyoctamethyleneadipamide, polydecamethylenecarbamide, polyhexamethylenesebacamide, polymerized 6-aminocaproic acid, polymerized 9-aminononanoic acid, and polymerized 11-aminoundecanoic acid. Interpolyamides prepared from mixtures of amino acids and dibasic acids and diamines, and polyesteramides consisting preponderately of the amide groups, can also be used in the compositions of this invention, as well as N-alkylated polyamides such as N-isobutyl polyhexamethylenesebacamide. Also, the N-alkoxymethyl polyamides prepared as described in U. S. application S. N. 539,195, filed June 7, 1944, by T. L. Cairns, now Patent No. 2,430,860 can be used in the compositions of this invention. Specific examples of this type of nylon include N-methoxymethyl polyhexamethyleneadipamide, N-butoxymethyl polyhexamethyleneadipamide, and the like.

The composition of this invention may also contain usual nylon modifying agents such as plasticizers, delusterants, and the like. For example, nylon yarns containing titanium dioxide as a delusterant, and nylon fabrics containing ethylene glycol as a heat-setting assistant, are effectively stabilized with hypophosphorous acid and its derivatives.

In addition to the hypophosphorous acid and its specific derivatives illustrated in the examples, other inorganic salts and organic derivatives of this acid can be used in the practice of this invention. Among these are salts such as potassium, calcium, magnesium, barium, and ammonium hypophosphites; organic derivatives such as the monoalkyl and monoaryl phosphinic acids (having the formula

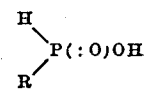

wherein R is an alkyl or aryl radical), e. g., phenylphosphinic, para-tolylphosphinic, and hexylphosphinic acids; salts of these acids, and of the isomeric phosphonous acids (having the formula $RP(OH)_2$, wherein R is an alkyl or aryl radical), such as sodium phenylphosphinate, potassium phenylphosphinate, magnesium hexylphosphinate, and the like; and the alkyl and aryl esters of these phosphonous and phosphinic acids, e. g., diphenyl ester of benzenephosphonous acid, butyl phenylphosphinate, ethyl hexylphosphinate, and the like. These hypophosphorous acid compounds are quite specific in providing satisfactory protection of nylon against loss of strength and discoloration on heating. Such closely related phosphorus compounds as triphenylphosphite, triphenylphosphine, pinene thiophosphite, phosphorous acid, and diphenyl phenylphosphonate are not effective for the present purpose in nylon subjected to elevated temperatures.

While the extended extraction of nylon with hot water reduces the tendency of the nylon to discolor and degrade on heating, the use of hypophosphorous acid or a derivative thereof for this purpose in nylon is more effective, especially in heat treatments of relatively short duration, and is more attractive from a practical standpoint.

Because of the improved resistance to degradation and discoloration by heat, the compositions of this invention are useful in all applications where the nylon is subjected to elevated temperatures. They are particularly useful in fabrics which are subjected to heat treatments to improve resilience and to improve their hand, in films or fabrics to which resins are to be applied, and as wire coatings. Hypophosphorous acid and its derivatives can also be employed as discoloration inhibitors in nylon subjected to chemical modifications, such as, for example, the formaldehyde treatment of nylon. In such applications, the modified nylon possesses the improved properties imparted by the chemical treatment and it is less discolored than nylon subjected to the same chemical treatment in the absence of the hypophosphorous acid derivative.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polycarbonamide having an intrinsic viscosity of at least 0.4, and a hypophosphorous acid compound in amount of from 0.01% to 20% by weight of said polyamide, said polycarbonamide having recurring hydrogen-bearing amide groups as an integral part of the main polymer chain, and having an average number of carbon atoms of at least 2 in the segments of the chain separating the amide groups, said hypophosphorous acid compound being selected from the group consisting of hypophosphorous acid and inorganic salts thereof, monoaryl and monoalkyl phosphinic acids, the salts and esters of said phosphinic acids and the salts and esters of monoaryl and monoalkyl phosphonous acids.

2. The composition set forth in claim 1 in which said polycarbonamide is polyhexamethyleneadipamide.

3. The composition set forth in claim 1 in which said polycarbonamide is the polymerization product of di(paraaminocyclohexyl)methane and sebacic acid.

4. The composition set forth in claim 1 in which said polycarbonamide is polyhexamethylenesebacamide.

5. The composition set forth in claim 1 in which said hypophosphorous acid compound is hypophosphorous acid.

6. The composition set forth in claim 1 in which said hypophosphorous acid compound is sodium hypophosphite.

7. The composition set forth in claim 1 in which said hypophosphorous acid compound is phenylphosphinic acid.

8. A process for obtaining improved heat-set synthetic polycarbonamide articles, said process comprising incorporating into said polycarbonamide from 0.01% to 20% by weight thereof of a hypophosphorous acid compound and then heating said polyamide in the form of a shaped article to a temperature above 140° C. but below the melting point of said polyamide, said polycarbonamide having recurring hydrogen-bearing amide groups as an integral part of the main polymer chain, and having an average number of carbon atoms of at least 2 in the segments of the chain separating the amide groups, said hypophosphorous acid compound being selected from the group consisting of hypophosphorous acid and inorganic salts thereof, monoaryl and monoalkyl phosphinic acids, the salts and esters of said phosphinic acids and the salts and esters of monoaryl and monoalkyl phosphonous acids.

9. The process set forth in claim 8 in which said polycarbonamide during said heating is in the form of a fabric.

10. The process set forth in claim 8 in which said polycarbonamide during said heating is in the form of a filament.

11. The process set forth in claim 8 in which said polycarbonamide during said heating is in the form of a film.

12. The product obtained by heating the composition defined in claim 1 to a temperature above 140° C. but below the melting point of said synthetic linear carbonamide.

HUGH W. GRAY.

REFERENCES CITED

The following references are of record in the file of this patent:

UNITED STATES PATENTS

| Number | Name | Date |
|---|---|---|
| 2,275,008 | Coffman | Mar. 3, 1942 |
| 2,309,729 | Gordon | Feb. 2, 1943 |
| 2,342,823 | Schlack | Feb. 29, 1944 |
| 2,345,700 | Dreyfus | Apr. 4, 1944 |